United States Patent [19]

Weidman

[11] Patent Number: 5,285,967

[45] Date of Patent: Feb. 15, 1994

[54] HIGH VELOCITY THERMAL SPRAY GUN FOR SPRAYING PLASTIC COATINGS

[75] Inventor: Larry G. Weidman, Fort Meyers, Fla.

[73] Assignee: The Weidman Company, Inc., Ft. Myers, Fla.

[21] Appl. No.: 997,607

[22] Filed: Dec. 28, 1992

[51] Int. Cl.$^5$ ............................................. B05B 7/20
[52] U.S. Cl. ........................................ 239/80; 239/85; 239/132.1; 239/139
[58] Field of Search .................. 239/79, 80, 85, 132.3, 239/132.1, 135, 139; 239/132.1, 135, 139

[56] References Cited

U.S. PATENT DOCUMENTS

| | | |
|---|---|---|
| 2,774,625 | 12/1956 | Hawley et al. . |
| 3,111,267 | 11/1963 | Shepard et al. . |
| 3,627,204 | 12/1971 | Stand . |
| 4,004,735 | 1/1977 | Zverev et al. . |
| 4,201,904 | 5/1980 | Weidman . |
| 4,231,518 | 11/1980 | Zverev et al. . |
| 4,290,555 | 9/1981 | Suwa et al. . |
| 4,333,416 | 6/1982 | Rotolico et al. . |
| 4,363,443 | 12/1982 | Huehne . |
| 4,370,538 | 1/1983 | Browning . |
| 4,416,421 | 11/1983 | Browning ............... 239/79 |
| 4,540,121 | 9/1985 | Browning . |
| 4,576,828 | 3/1986 | Walker, Jr. . |
| 4,632,309 | 12/1986 | Reimer . |
| 4,688,722 | 8/1987 | Dellassio et al. . |
| 4,694,990 | 9/1987 | Karlsson et al. . |
| 4,865,252 | 9/1989 | Rotolico et al. . |
| 4,869,936 | 9/1989 | Moskowitz et al. . |
| 4,911,363 | 3/1990 | Webber . |
| 4,928,879 | 5/1991 | Rotolieo . |
| 4,964,568 | 10/1990 | Rotolico et al. . |
| 5,014,915 | 5/1991 | Simm et al. . |
| 5,041,713 | 8/1991 | Weidman . |
| 5,047,265 | 9/1991 | Simm et al. . |
| 5,148,986 | 9/1992 | Rusch ........................... 239/85 |

OTHER PUBLICATIONS

Miller Thermal, Inc, "Top Gun HVOF Spray System" Brochure.

*Primary Examiner*—Andres Kashnikow
*Assistant Examiner*—William Grant
*Attorney, Agent, or Firm*—Middleton & Reutlinger

[57] ABSTRACT

A high velocity, oxygen fuel ("HVOF") thermal spray gun for spraying a melted powder composition of, for example, thermoplastic componds, thermoplastic/metallic composites, or thermoplastic/ceramic composites onto a substrate to form a coating thereon. The gun includes an HVOF flame generator for providing an HVOF gas stream to a fluid cooled nozzle. A portion of the gas stream is diverted for preheating the powder, with the preheated powder being injected into the main gas stream at a downstream location within the nozzle. Forced air and vacuum sources are provided in a shroud circumscribing the nozzle for cooling the melted powder in flight before deposition onto the substrate.

35 Claims, 6 Drawing Sheets

HIGH VELOCITY THERMAL SPRAY GUN FOR SPRAYING PLASTIC COATINGS

The present invention relates to a high velocity oxygen fuel ("HVOF") thermoplastic coating spray gun having a liquid cooled nozzle and combustion chamber The present invention further relates to a hand held HVOF thermoplastic coating spray gun for high velocity flameless spraying of a variety of polymer compositions at low, substantially reduced main plume gas temperatures of as much as 50 percent on surfaces such as wood, fiberglass composites, plastic, metal, or even cardboard without damaging the surface or exposing the operator to potentially toxic fumes resulting from melted polymer substrates, such as for example, fluoropolymers. The present invention is especially suited for fluoropolymers which require low temperature thermospikes, (preheating), and long particle dwell time in the heated gas plume followed by process cooling using air or inert gas jets before deposition of the plastic particles to the substrate to be coated.

The present invention even further relates to a spray gun for a thermoplastic coating spray system wherein spraying high temperature thermoplastic coatings include means for providing a low temperature high velocity jet gas stream through a water cooled nozzle assembly thereby reducing and controlling the heat of the gas stream, diverting a portion of the gas stream through auxiliary gas plume conduits within the nozzle for preheating a powdered polymer injected through adjacent conduits, injecting the preheated powdered polymer into the main gas stream and converging auxiliary gas streams at a downstream point in the nozzle for further high temperature heating of the polymer thereby accelerating the molten plastic substrate particles at subsonic or supersonic spray velocities without overheating the plastic particles, providing forced air and vacuum means within an airflow shroud circumscribing the nozzle for providing cooling gases to cool the melted plastic particles in flight before deposition upon a selected substrate.

Known thermal spray processes are characterized by chemical combustion heating including powder flame spraying, wire/rod flame spraying, and detonation/explosive flame spraying, and by electrical heating processes including plasma flame spraying.

The most popular conventional high temperature thermal spray guns use plasma, an ionized gas consisting of free electrons, positive ions, atoms and molecules, as a means of heating a material, such as metal powder, to a molten state at a high temperature and depositing the metal as a coating on a substrate, such as a chrome plate on an automobile part. The plasma is usually generated at temperatures in the vicinity of 15,000° C. by the passage of a gas though an electric arc. In typical plasma spraying systems, a selected gas, such as argon or nitrogen, flows between an anode and a cathode. An electrical arc is generated between the anode and cathode, both heating and propelling a heat fusible material carried with the gas. The movement of the gas between the anode and cathode effectively lengthens the path of the arc, causing more energy to be delivered to the arc. The resulting plasma may issue from the nozzle at subsonic to Mach II speeds, with a flame of intense brightness and heat resembling an open oxyacetylene flame.

The intense heat associated with a high temperature plasma and the rapid flow of the hot gases through a gun presents a highly efficient means of melting a heat fusible substrate and spraying it on a selected surface. The plasma flame spray guns previously developed have been principally designed to apply powdered ceramics, plastics, or metals which have high melting temperatures. These materials are typically injected directly at or near the arc to achieve the instantaneous melting required when the plasma stream is flowing at sonic or near sonic speeds. Despite the intense heat generated at the arc, the temperature of the plasma stream drops rapidly across the intervening distance between the electrode and the target surface. This drop is a function of gas enthalpy, energy absorption by the powdered material, and work distance.

The durability and density of high temperature sprayed coatings have produced a demand for devices which can effectively apply these particle melt coatings. In contrast to painted coatings, which require a great deal of surface preparation and wear rapidly, high temperature particle melt coatings provide a wear resistant coating of high density with a high bond strength generated as a result of the high velocity impact of the molten composition onto the target surface. In addition, only a nominal amount of grit blasting to slightly roughen the surface and remove any surface contamination is necessary to prepare the surface for high temperature flame spraying. However, certain polymer compositions have heretofore been difficult to use in hand held operation because of the toxic fumes released by the molten polymer in a high temperature plasma stream. Furthermore, prior apparatus made it difficult to prevent the high temperature plasma stream from scorching the surface during application. The high heat of the plasma stream in close proximity to the user also poses a safety hazard in the event the gas stream were to be inadvertently directed at the user or another person. Because of the high heat generated by the plasma stream, the target surface remains hot after the deposit of the coating, resulting in additional release of toxic fumes into the environment.

There are a number of known devices for spraying powders of high temperature thermoplastics or other high temperature polymer coatings to a variety of surfaces such as U.S. Pat. No. 3,676,638, which discloses a nozzle whereby powder is fed into the plasma stream downstream from the arc. U.S. Pat. No. 2,774,625 teaches an apparatus which uses detonation waves in spraying powders; U.S. Pat. No. 3,111,267 teaches a spray gun apparatus for applying heat fusible coatings on solid objects wherein powder material is feed directly through a heating zone in the spray in which it reaches a molten or at least, heat plastic condition and is then propelled at a relatively high velocity on to the object to be coated; U.S. Pat. No. 3,627,204 teaches a spray nozzle arrangement for plasma gun wherein powdered material is added into a spray nozzle downstream of an arc chamber; U.S. Pat. Nos. 4,004,735 and 4,231,518 teach apparatuses for a detonating application of coating of powdered material; U.S. Pat. No. 4,290,555 teaches a method for introducing powder into a gas steam to be provided to a burner; U.S. Pat. No. 4,370,538 teaches an apparatus for spraying heated powder and the like wherein the apparatus includes a combustion chamber which is cooled by air flowing through an annular passage; U.S. Pat. No. 4,688,722 teaches a nozzle assembly for a plasma spray gun; U.S. Pat. No. 4,911,363 teaches a flame spray apparatus including a combustion head provided with radially spaced longitudinal channels extending inwardly from the periphery thereof along which water passes to cool the combustion head. Moreover, U.S. Pat. No. 5,041,713 teaches an apparatus for flame spraying polymers on a variety of target surfaces providing a laminar flow plasma gas stream.

It has become increasingly popular to attempt to apply low temperature synthetic polymer powders by the plasma flame spray method. Flame sprayed polymer powders are lighter in mass and have a much lower melting point than ceramics or metals As a result, the high temperatures of the arc producing the plasma tend to "burn" the polymer powder and particle melt rendering the resulting coating unsuitable. Furthermore, these prior plasma spray devices have been limited in the rate of application due to the low arc power settings necessary to avoid "burning" the polymer, and have had a tendency to produce a somewhat uneven coating with splattering and dangerous and inefficient over-spray.

Alternatively, high velocity, oxygen fuel ("HVOF") flame spraying is another method of applying heat fusible materials to a variety of heat resistant surfaces. HVOF flame spraying of thermoplastic coating materials is a method of applying thermoplastic materials to heat resistant surfaces such as those on aircraft bodies to provide a covering for small apertures therein. However, conventional methods of application are expensive, bulky, cumbersome, and difficult to use and control.

Low velocity powder flame spraying is the earliest form of thermal spraying and involves the use of a powder flame spray gun consisting of a high capacity oxy-fuel gas torch and a hopper containing powder to be applied as a coating on an object. A small amount of oxygen from the gas supply is diverted to carry the powder by aspiration into the oxy-fuel gas flame where it is heated and propelled by the exhaust flame onto the work piece. The fuel gas is usually acetylene or hydrogen which provides a gas temperature in the range of about 3,000° F. to 4,000° F. Particle velocities are in the order of about 80 to 100 feet per second. The coatings produced from this process generally have low bond strength, high porosity, and low overall cohesive strength.

Conventional low velocity open atmosphere powdered flame spray guns utilize a plurality of passageways extending through the gun body to deliver a thermoplastic powder, combustion air, and a fuel into an open mixing combustion chamber. Ignition of the fuel and gas mixture melts the plastic which is carried from the combustion chamber by the air so as to provide a plastic coating on an object to be coated, such as is described in U.S. Pat. No. 4,632,309. The flame temperature of these open flame spray devices produce a flame temperature of approximately 3,000° F. to 4,500° F. The entrained air which carries the melted particles cool the temperature of the hot gases to the plasticization temperature of the thermoplastic material from about 180° F. to 750° F. The velocity of the low velocity flame spray chemical process produces a coating of low bond strength, and uneven particle melt wherein some of the thermoplastic particles are amorphous and other overheated particles are crystalline. The thermoplastic particle melt adsorbs oxides in the open atmosphere that are entrained in the open flame plume. The strength of the thermoplastic coating is compromised due to the degradation of the crosslinked polymer.

The low velocity, low energy process produces inappropriate features for achieving repeatable high production depositions of thermoplastics. In some cases less than 60% of the particles are melted in the hot gas stream. Often the operator will be required to shut of the thermoplastic powder feed and manually preheat the surface of the object being coated to a temperature the same as or higher than the temperature of the thermoplastic particle melt. The inefficient melting of the particles and method of application reduces the effectiveness of the coating. The process is very dependent upon the skill of the spray gun operator to recognize under and/or overheating of the polymer particle melt in the gun and on the surface of the object being coated.

Another disadvantage of the existing low velocity open flame processes is the inability to spray thermoplastic coatings on different substrates having high or low heat capacities. Various substrates such as steel, fiberglass, and cardboard require that the thermoplastic particle melt be applied at the appropriate distance due to the residence the time required for the particles to be cooled in the air stream prior to contacting the substrate. Maintaining particle velocity is difficult under these conditions.

Alternatively, high velocity, oxygen fuel ("HVOF") flame spraying has proven to be a highly efficient and effective method of applying heat fusible materials to a variety of heat resistant surfaces. High velocity powder flame spraying was developed about 1981 and comprises a continuous combustion procedure that produces exit gas volocities at about 4,000 to 5,000 feet per second. The process requires burning a fuel gas such as propylene with oxygen under high pressure at approximately 60 to 90 pounds per square inch in an internal combustion chamber. Hot exhaust gases discharge from the combustion chamber through exhaust ports and expand into an extended nozzle. Powders of high melting temperatures such as metal or ceramic materials are fed into the nozzle and confined by the exhaust gas stream until the particle melt exits the nozzle in a high speed jet stream having about a one half inch diameter and a length of about 36 inches. The molten particle jet stream produces a more dense coating than coatings produced with low velocity powder flame spraying techniques.

High velocity oxygen flame spray devices utilize wire or rod material, such as metal, and are therefore known as metallizing processes. The wire/rod feed material is continuously fed into an oxy-acetylene flame to melt the wire/rod and atomize the particle melt with an auxiliary stream of high pressure air to deposit the feed material as a coating on the object to be coated. This process is also used to deposit coatings of ceramic, and plastic tubing filled with metal and/or ceramics. However, the high gas temperatures produce diluted polymer films and inconsistent deposition of overheated and under heated polymer melt particles throughout the bonded layer or layers of coatings.

These problems associated with the conventional plasma thermal guns, and conventional low velocity and high velocity thermal guns have been solved by the HVOF thermal spray gun of the present invention. The HVOF gun in the claimed invention produces a high speed gas velocity and a high speed particle velocity in the range of from about 1,000 to 1,800 feet per second, while simultaneously producing a low temperature gas stream having an adjustable powder feed and temperature range from about 150° F. to 750° F. to properly preplasticize polymers and obtain optimal temperatures for the thermoplastic particle melt.

None of the aforementioned references teach or remotely suggest the idea of preheating a thermoplastic coating material prior to the introduction of the plastic substrate into the plasma stream, nor teach a method of controlling the temperature of the powder substrate and melted polymer particles for various low temperature polymers as does the HVOF thermal spray gun of the present claimed invention.

SUMMARY OF THE INVENTION

In the present invention, a system is devised to be capable of preplasticization of high temperature thermoplastic powders having a narrow range of processing parameters that produce optimum high crystalline coatings. In this system, hyper velocity combustion flameless spraying is characterized by the use of burning oxygen fuel that is directed through a nozzle to accelerate powder particles to extremely high velocities of up to 500 meters per second. In this spray system, for example, propylene or hydrazine is used as the fuel, oxygen is utilized as the combustion agent and an inert gas such as nitrogen is used as a carrier gas for the molten polymer particles, and in some cases as a shielding gas for polymers such as phenol-formaldehyde ("PF") and polytetrafluoroethylene ("PTFE").

The present invention provides a means for HVOF flameless spraying polymers on a variety of target surfaces by providing a cooled, laminar flow HVOF gas stream with a minimum of turbulence. The spray gun of the present invention includes a conventional HVOF flame generator and a novel nozzle for cooling the HVOF gas stream, providing a HVOF gas stream having a minimum of turbulence between the nozzle and the target surface. The liquid cooled barrel within the nozzle encapsulates the HVOF gas plume and is designed to cool down the HVOF gas plume substantially without reducing the velocity of the HVOF gas plume, and produce a spray pattern of approximately 4 to 6 inches in a generally oval pattern. The nozzle is also designed to reduce noise.

The flameless HVOF gun of the present invention includes a fluid-cooled HVOF flame generator, a nozzle, and means for attaching the nozzle to the HVOF flame generator. The nozzle includes a fluid-cooled barrel in fluid communication with the HVOF flame generator through which the HVOF gas stream passes upon exiting the HVOF flame generator. An open, co-axial airflow shroud circumscribes the nozzle and extends downstream therefrom, providing means to permit air to flow from the rear of the barrel to the front of the barrel in the same direction and substantially co-axial with the flow of the HVOF gas stream. Thermoplastic coating feed substrate feed tubes are mounted exterior to the nozzle for introducing polymer, usually in powdered form, into the HVOF gas stream downstream from the combustion chamber near the end of the barrel. Furthermore, the nozzle is designed to provide a means to preheat the thermoplastic feed substrate to a preselected temperature prior to introduction of the substrate into the HVOF stream at a point downstream of the barrel outlet opening.

More particularly, the nozzle of the present invention includes an elongated generally conical shaped barrel which is provided with a liquid-cooled central bore having an interior adapted to receive the HVOF flame. The nozzle, including the barrel therein, is attached to the HVOF flame generator by an adaptor plate which permits the exchange of coolant between the generator and the nozzle. The nozzle is thus cooled both by the circulation of coolant on the interior thereof, as well as the flow of air over the exterior surface provided by the co-axial airflow shroud.

Surrounding the nozzle is a generally hourglass-shaped venturi manifold with the waist of the hourglass-shaped interior wall lying in the same plane as the front end of the nozzle. In the preferred embodiment, a vacuum source is attached to the venturi manifold surrounding the nozzle to both cool the target surface and draw fumes and polymer which may be splattered off the target surface into the space between the interior and exterior walls of the nozzle to a separate filtering device. Toxic vapors resulting from the melting of particular polymers are thereby captured, shielding and maintaining a safe working environment for the operator.

The conical design of the manifold and co-axial airflow shroud circumscribing the nozzle provides a means for mixing the coaxial flow of air and HVOF gas, whereby the HVOF gas stream exits the nozzle with a minimum of turbulence and remains substantially in laminar flow as it is projected to the surface of the object being coated therewith. The surrounding ambient air outside of the nozzle cools the HVOF gas stream sufficiently to enable coating of combustible materials such as cardboard or fiber glass reinforced plastic substrates at a distance as close as four inches (ten centimeters). The capability of operating the HVOF spray gun close to the surface of the object minimizes the danger to other workers and permits accurate and uniform coating. The ability to hold the nozzle of the gun close to the surface also increases the effectiveness of the vacuum recovery manifold for cooling the target surface and preventing vapor and particle loss to the atmosphere. Furthermore, the exterior wall of the venturi manifold also acts as a shroud to enclose the open arc, thereby preventing eye burn to the operator and other workers in the vicinity. The absence of a "flame" extending beyond the nozzle also improves the safety of the device.

The extended and expanded nozzle assembly of the present invention having a one piece barrel connected to the combustion chamber is distinguished from prior art HVOF spray guns due to the innovative use of water passageways spaced to properly cool the combustion chamber and provide a means of preheating the plastic feed substrate to a selected temperature to facilitate application of the polymer to a selected surface and avoid scorching or burning of the polymer substrate.

The HVOF gun of the present invention provides factory set, adjustable valves incorporated into the nozzle assembly that transfers directly to the powder injection conduits to allow proper preplasticization of the powder substrate before it is injected into the HVOF gas plume. As each particular powder substrate has a definite preheat temperature and/or molten point, prior art plasma thermal gun spray devices often required a number of powder feed preheat injector nozzles for substrates which melt at various temperature ranges.

The high energy HVOF thermoplastic spray gun of the present invention is designed so that the energy thoroughly melts the thermoplastic in flight instead of depending on heat build up in the substrate while spraying to melt the sprayed on particles. Flame spray torches with thermal energy capabilities from 30,000 to 120,000 BTU/HR have been developed by various manufacturers and are in limited commercial use for spraying a very narrow range of thermoplastic powders. All of these efforts are limited by flame speed from about 300 to 450 feet/sec on open flame of a conventional flame spray torch. The first successful approaches to increase flame speed were based on confining and accelerating the speed by use of air jets surrounding the flame or arranging on both sides. This approach increased and maintained the flame speed at a more constant value, but is restricted to distances of about 1 to 4 inches. The distance depends on the air pressure and on the configuration of the air jets. A further energy limitation of the conventional flame spray torches is that even with oxygen acetylene, the maximum flame temperature is approximately 5,600° F. The resulting temperature of the powdered thermoplastic particles which determine the major portion of their total energy content is a function of their dwell time, or trajectory through the flame. Particle temperature can, for example, be increased by increasing dwell time by injecting the particles perpendicular to the flame.

The total energy of the powdered thermoplastic particles is a combination of the kinetic energy and the thermal energy. The conventional flame spray process for spraying plastics obtains a small portion, approximately 10%, of its total energy from kinetic energy, whereas the HVOF thermoplastic spray gun of the preferred embodiment obtains over 50% of its total from kinetic energy. The HVOF flameless thermal spray gun of the present invention utilizes variable heating phases of preheat temperature of thermoplastic powder followed by variable acceleration to the final speed of particles during their flight. Both the heating and the acceleration are matched to the specific chemical and physical characteristics of the thermoplastic powder feed substrate and to the desired coating properties.

A principal advantage of the HVOF spray gun of the present invention is to have enough resolution to preheat high temperature engineering thermoplastic particles from 0° to 700° F. by adjusting the valves of the auxiliary preheat gas keeping powder feed carrier gas and volume of powder constant. The dwell time in the chamber determines the temperature rise of the particles. A plurality of auxiliary preheating jets or conduits extend longitudinally into the central bore of the barrel and adjoin the main HVOF gas plume near the end of the extended, expanded mixing zone of the conical shaped front portion of the barrel. In the preferred embodiment, four auxiliary preheating combustion gas plumes cause a substantial drop in temperature and velocity in the combustion chamber. This reduction in temperature provides a substantial elimination of a thermal spike at the core of the combustion chamber transferring down to the small diameter nozzle. The main gas plume velocity is reduced by the back pressure and the area consumed by the diameters of auxiliary orifices in the combustion chamber. This low melting point preheat combustion chamber expansion barrel provides correct velocity and thermal energy to properly spray a wide range of thermoplastic materials. The low pressure conditions are maintained by constantly withdrawing gas from the combustion chamber to counteract the constant injection of the HVOF combustion gases. The auxiliary preheating gas streams are cooled at the barrel walls by the circulation of liquid coolant within the nozzle surrounding the barrel. The velocity of the HVOF gas stream is maintained due to the large reduction in the total temperature without any accompanying reduction in the kinetic energy at the auxiliary preheating jets. The auxiliary preheating jets are adjoined with the main plume in the expanded barrel zone that has been substantially reduced in heat via circulation of the coolant. The combustion gas temperatures producing the HVOF gas plume are in the lower range for melting temperatures of thermoplastics, from about 175° F. to about 750° F. The combination of gas velocity, particle speed, and entrained air (shielding gas) temperature are controlled parameters.

The one piece combustion chamber having a preheated barrel and coaxial shroud assembly with a vacuum manifold and forced air means provides the following advantages. A spray pattern with a stand off distance of 12 inches from the end of the gun shroud provides a 4 to 5 inch spray pattern. The expanded nozzle reduces the particle speed and velocity from the standard HVOF from 1,900 feet per second particle speed down to 1,000 feet per second. The 1,000 feet per second range is the most desirable for spraying thermoplastic particles ranging from 75 to 53 microns. Parameters above 1,000 feet per second are not necessary and are useless producing a severe splattering effect of high speed particles striking the previous coating layer producing pinholes and craters. The high velocity gas will also blow the molten coating particles that are attached to the substrate and produce gas holes, entrapment, blistering and holes in the coating. This increased area of high density gas is paramount in the ability to inject multi feed injections of powder up to 60 pounds per hour. Although the lightweight thermoplastic powder feed substrate could be injected through a single feed port, the preferred embodiment of the present invention utilizes two powder feed ports to inject the thermoplastic feed powder into the nozzle in order to evenly absorb the mixing of powder and its kinetic energy. It is also contemplated that additional feed ports could be incorporated within the present invention as well. The powder feed is conveyed by a carrier gas supplied by recovered hot exhaust gases that radiate off the HVOF gas plume, and are recirculated and compressed up to 100 pounds per square inch.

Moreover, a vacuum supply for the present invention is connected to the venturi manifold assembly that is incorporated within the co-axial shroud housing. Radiant heat and vapors that are produced when heating the thermoplastic powders up to the plasticization state and rebound particles are removed during the spraying operation The vacuum recovery system may be equipped with filters to remove harmful vapors.

Furthermore, a forced air system supplies forced air around the venturi manifold within the co-axial shroud distributing the gas around the nozzle. The telemetry of the preheating auxiliary jets direct the auxiliary forced air around and between the venturi manifold and the co-axial shroud at a selected distance from the nozzle thereby encompassing the main stream of the combustion gas plume. The auxiliary preheating jets also provide a high concentration of entrained air shielding gas that substantially affects the thermodynamic and transport properties of the plume.

The disassociation process created by the forced air and vacuum absorbs large amounts of energy, thus allowing more recycled gas to enter the plume. Therefore, more thermoplastic feed powder can be induced into the system without a flame appearing or "flash back" conditions. The HVOF gas plume and the entrained air around the venturi manifold fully mix on the center line at approximately 60 millimeters or about 2.5 times the nozzle diameter. The gas plume is now considered to be fully turbulent. Eddies of external air continue to be engulfed and then absorbed into the plume along its length of flight, further reducing both the temperature and the velocity. This design of the invention aids in rapid coating of the thermoplastic melt particles which increases the crystallinity of the thermoplastic particles and slows down the velocity of molten particles after they have been passed through the cool, high velocity zone at the end of the expanded barrel of the nozzle.

Furthermore, the gas jets also produce a pressure differential in the venturi area of the inner shroud and gun member, drawing more outside air from the rear air inlet gun shroud area and directing the air to form circumferentially around the plume. Optimized parameters are obtained by regulating power feed rate, auxiliary shroud air pressure, adjustable preheat levels, and additional arc power.

The HVOF flameless thermoplastic spray gun of the present invention is capable of preplasticization of high temperature engineering thermoplastic powder having a narrow range of processing parameters that produce optimum high crystalline coatings. Hyper velocity combustion flame spraying is characterized by the use of burning oxygen fuel that is directed through a nozzle to accelerate powder particles to extremely high velocities up to 500 meters per second. In the preferred embodiment of the HVOF flameless thermoplastic spray gun of the present invention, acetylene, propane, propylene, hydrogen, or MAPP is used as the fuel, oxygen as the combustion agent, and argon or nitrogen as the powder feed carrier gas. The HVOF thermal spray gun produces a hot stream of gas usually generated at temperatures in the vicinity of from about 150° F. to 750° F. The HVOF gas plume produced can be controlled to exit the nozzle from subsonic to Mach II speeds, with a flame of intense brightness and heat resembling an open oxy-acetylene flame; however, the flame is controlled so as not to extend pass the protective co-axial shroud. The versatile combustion gas mixing chamber uses these various fuel gases to optimize coating economics when considering both fuel costs and coating quality. The oxygen and fuel gases are mixed in the flame nozzle just prior to burning, and the nozzle design assures good gas mixing and efficient combustion.

It is an object of the present invention to provide a high velocity oxygen fuel thermoplastic spray system.

It is another object of the present invention to provide a high velocity oxygen fuel thermoplastic coating spray system wherein the thermoplastic coating is preheated prior to introduction into a HVOF gas stream.

It is an object of the present invention to provide for the use of high velocity spraying while eliminating the high radiant heat and intense light containing dangerous ultraviolet rays that are prevalent with open HVOF and conventional HVOF equipment. The use of welding helmets with dark lenses is eliminated, whereas sun glasses with side shields are all that is required.

It is another object of the present invention to provide for high volume deposition of up to sixty pounds of light weight thermoplastic powder per hour on a substrate.

Another object of the present invention is to prevent generation of violent sound that can be stabilized at 60 to 70 decibels.

Furthermore, it is another object to provide a shroud to encapsulate the hot gas HVOF plume column to allow operation of the present invention in populated work areas.

Yet another object of the present invention is to provide a vacuum recovery for hot gas, fumes, and particle matter in combination with means for the recovery and recycling of the expensive fuel gases consumed by the operation; and to employ retroactive carrier gas, or air to maintain maximum powder feed rate in combination with the air fuel mixture to maintain and prevent hot HVOF gas from becoming a flame condition.

Even further, it is an object of the HVOF flameless spray gun of the present invention to reduce the amount of expensive inert gas and reduce the cost or operation of the spray gun in the field for spraying pressure vessels, linings, and protective coatings by manual and robotic operations.

The HVOF flameless spray gun of the present invention extends the capabilities of conventional flame spraying to include deposition of high temperature engineering thermoplastic and solves additional industrial problems with high quality coatings to provide a cost effective alternative to other high energy combustion processes, as well as conventional HVOF spray of thermoplastic coating processes.

These and other advantages will be readily apparent to those skilled in the art from the disclosure recited herein.

BRIEF DESCRIPTION OF THE DRAWINGS

A better understanding of the present invention will be had upon reference to the following description in conjunction with the accompanying drawings in which like numerals refer to like parts throughout the several views and wherein.

DETAILED DESCRIPTION OF THE PREFERRED EMBODIMENT

Figure 1:
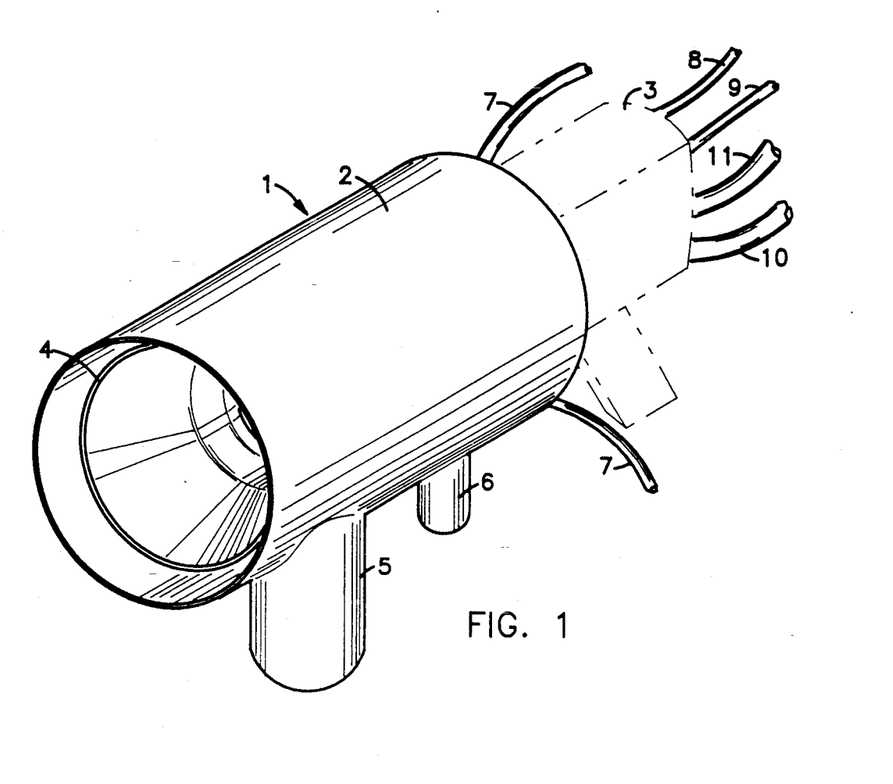
FIG. 1 is a perspective view of the HVOF thermal spray gun of the present invention showing the co-axial shroud surrounding the venturi manifold and the handle of the gun being shown in phantom lines.
Figure 2A:
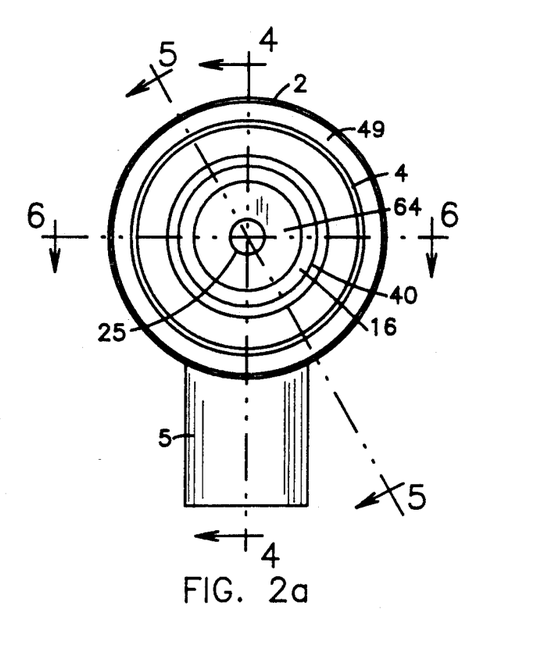
FIG. 2(a) is an elevational front end view of FIG. 1 of the present invention, showing the annular space between the co-axial shroud housing enclosing an aspirated air venturi manifold which surrounds the nozzle having a barrel therein.
Figure 2B:
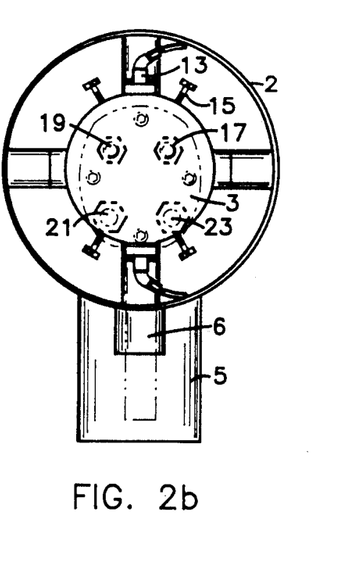
FIG. 2(b) is a rear end view of the spray gun of FIG. 1 of the present invention showing the oxygen, fuel gas, and coolant connections.

Referring now to the drawings, FIG. 1 shows a high velocity oxygen fuel ("HVOF") thermoplastic spray gun apparatus for applying HVOF sprayed polymers in accordance with the present invention. The spray gun 1 of the present invention includes a generally cylindrically shaped housing forming a co-axial airflow shroud 2 attached to and surrounding a venturi manifold assembly 4, further enclosing an elongated nozzle assembly 16 surrounding an elongated barrel 20 (FIG. 4) extending from a generally pistol-shaped gun body 3 having a rear handle according to FIG. 1. As shown in FIG. 2a an annular space is created between the co-axial shroud 2 and the aspirated air venturi manifold 4 which surrounds the nozzle having a barrel therein. Extending outward generally perpendicular to the longitudinal axis of the shroud 2 is a vacuum connection 5 and a forced air connection 6. A pair of plastic powder feed tubes 7 project radially outward between the shroud 2 and gun body 3. An oxygen feed tube 8, fuel gas feed tube 9, coolant feed tube 10, and coolant exit tube 11 are shown extending from the rear of the gun body 3 as illustrated in FIG. 2b.

Figure 3:
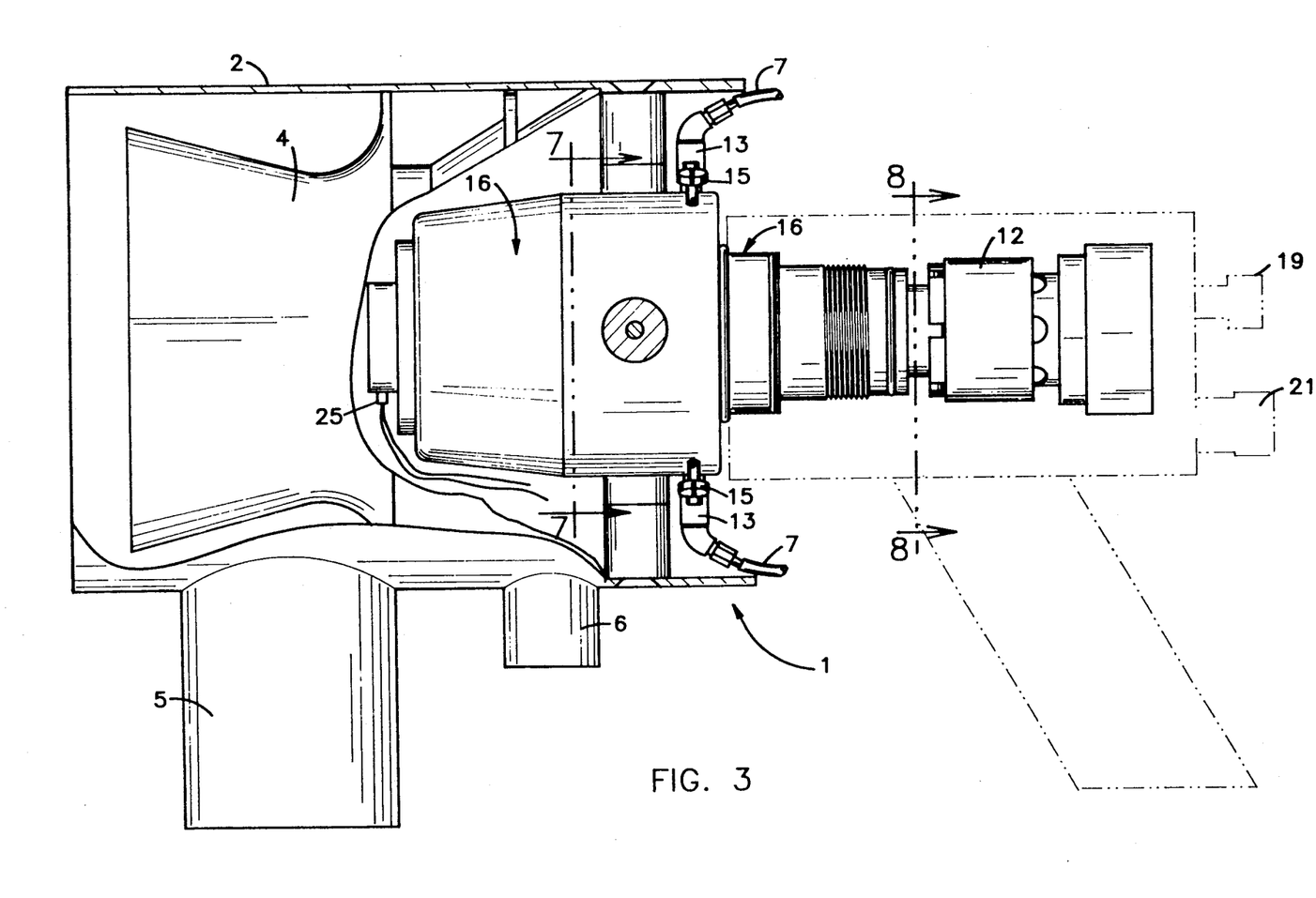
FIG. 3 is a perspective cut-away side view of the thermal spray gun of FIG. 1 with selected portions cut-away, showing the outer co-axial shroud housing enclosing a venturi manifold which surrounds a nozzle assembly having polymer feed tubes and preheater adjusting screws extending radially from the rear portion thereof and a barrel portion extending therefrom connected to the combustion chamber within a gun handle assembly shown in phantom lines.
Figure 4:
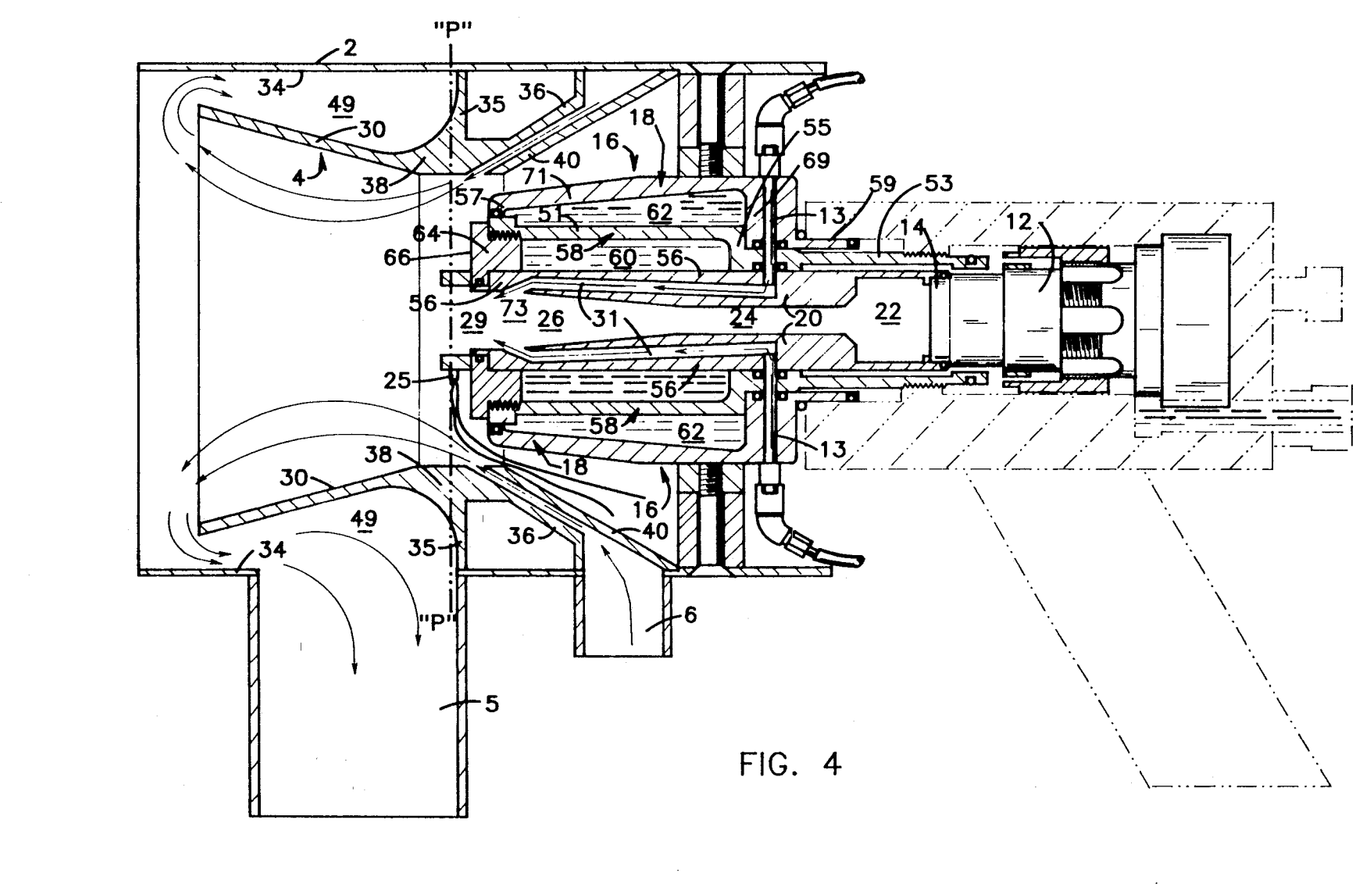
FIG. 4 is a longitudinal sectional view of the present invention taken along the vertical axis shown as line 4—4 of FIG. 2a, showing the nozzle assembly having a plurality of coolant passages therein surrounding a barrel having a pair of polymer feed conduits extending generally longitudinally being positioned opposite one another along a portion of the barrel between the cooling conduits and the barrel bore.

As shown in a perspective cut-away side view in FIG. 3, the outer co-axial shroud housing 2 encloses the venturi manifold 4 which surrounds the nozzle assembly 16 having polymer feed tubes 7 and preheater adjusting screws 15 extending radially from the rear portion of the nozzle 16. The barrel 20 enclosed within nozzle assembly 16 extends rearward connecting the nozzle assembly 16 and barrel combustion chamber 22 to the fluid-cooled HVOF flame generator 12 by means of an adaptor plate 14 (FIG. 4). The open co-axial airflow shroud 2 circumscribes the venturi manifold 4 and the entire nozzle assembly 16 extending frontward, downstream therefrom, to permit air to flow from around the rear of the nozzle 16 to the front of the nozzle 16 in the same direction and substantially co-axial with the flow of the HVOF gas stream through the barrel 20. The shroud 2 surrounding the outer end of the nozzle 16 directs the flow of HVOF gas exiting the nozzle and air streams surrounding the nozzle 16 by the interaction of the vacuum drawn through the vacuum connection 5 and forced air fed through connection 6.

As shown in FIG. 4, the nozzle assembly 16 includes a plurality of coolant passages therein extending generally longitudinally and surrounding the barrel 20. A pair of polymer feed conduits 13 extend radially from the exterior of the nozzle 16 inwardly into the barrel 20. The polymer feed conduits 13 form a bend and extend generally longitudinally within the barrel block 20 forming powder feed conduits 31 within a portion of the barrel 20 between the cooling passages of the nozzle 16 and the barrel bore 24 providing a preheating zone for the polymer feed substrate. An ignition device 25 for igniting the oxygen and fuel gas mixture is attached to the front end of the nozzle 16. An oxygen feed connection 17, a fuel gas feed connection 19, a coolant feed connection 21, and a coolant exhaust connection 23 extend from the rear of the gun housing.

More particularly, FIG. 4 shows the generally hourglass-shaped, circumferential vacuum venturi manifold 4 enclosed coaxially within the airflow shroud 2. The venturi manifold 4 is defined by a first frustoconical member 30 having an outer diameter slightly less than the interior diameter of the shroud 2 and having a waist 38 with a reduced external diameter surrounding the nozzle 16. The waist 38 is joined to a second frustoconcial member 36 extending from the waist 38 rearwardly inward connecting to the inner wall 34 of the shroud 2 forming an air tight connection. An angled baffle 40 attached to the inner wall 34 of the shroud 2 extends frontwardly inward to the waist 38, spaced apart, and parallel to the second frustoconical member 36 to form an annular forced air passage 42 surrounding the elongated nozzle 16 in fluid communication with the forced air connection 6 between the second frustoconical member 36 and the baffle 40.

Moreover, a planar wall 35 extending outward from and normal to the waist 38 attaches to the inner wall 34 of the shroud 2 to support the venturi manifold 4. The annular opening between the inner wall 34 of the shroud 2, the first frustoconical member 30, and the planar waist wall 35 defines an airway thereinbetween forming a circumferential vacuum recovery chamber 49 in fluid communication with vacuum connection duct 5 for the passage of air, gases, and stray particulate matter drawn therethrough by a vacuum source.

The waist 38 of the hourglass-shaped venturi manifold 4 lies in the same plane as the nozzle 16, thereby providing a venturi effect for the HVOF gas exiting the nozzle 16. The coaxial venturi forced air or auxiliary gas flowing within the shroud 10 provides circumferential flow that allows proper flow around the HVOF gas plume column for effective high volume spraying. The velocity of the powder feed carrier gas pressure adjoining the auxiliary jet preheating gas, forces the preheated powdered plastic particle melt into the center of the main HVOF gas plume that has been cooled down substantially to assure heating to the proper temperature.

The vacuum drawn air both cools the target surface and draws fumes and polymer which may be splattered off the target surface into the vacuum recovery chamber 49 of the shroud 2 to a separate filtering device. The gases that are removed from the circumferential vacuum recovery chamber 49 formed between the venturi manifold 4 and co-axial shroud 2 provide fume exhaust and remove particle matter during the spraying operation. The vacuum recovery system also returns the forced air into the circumferential venturi manifold 4. A pressurized powder feed canister and carrier gas is bled off when the vacuum can induce enough pressure to take over this operation. This process of using hot, recycled gas to operate carrier gas and canister gases pressure provides a means for a carrier gas that does not reduce the temperature and velocity of the HVOF in the mixing process.

The elongated nozzle 16 of the HVOF spray gun extends outward into the continuous open coaxial airflow area of the vacuum recovery chamber 49 a sufficient length so that the front of the nozzle 16, waist 38 of the venturi manifold 4, and baffle 40 all lie in the same plane, P—P of FIG. 4, substantially to normal to the HVOF gas stream flow axis to facilitate proper circulation of the gases therearound.

The conical design of the venturi manifold 4 circumscribing the nozzle 16 provides a means for mixing the coaxial flow of air from around the exterior of the venturi manifold and the HVOF main gas plume from within the barrel 20, whereby the HVOF gas stream exits the nozzle 16 with a minimum of turbulence and remains substantially in laminar flow as it is projected toward the surface of the object being coated therewith. The surrounding ambient air outside of the nozzle 16 cools the HVOF gas stream sufficiently to enable coating of combustible materials such as cardboard or fiber glass reinforced plastic substrates at a distance as close as four inches (ten centimeters). The capability of operating the HVOF spray gun close to the surface of the object minimizes the danger to other workers and permits accurate and uniform coating. The ability to hold the nozzle 16 of the gun close to the surface also increases the effectiveness of the vacuum recovery chamber 49 for cooling the target surface and preventing vapor and particle loss to the atmosphere. Furthermore, the co-axial shroud 2 enclosing the open arc prevents eye burn to the operator and other workers in the vicinity. The absence of a "flame" extending beyond the shroud 2 improves the safety of the device providing for a flameless thermal spray gun.

Figure 5:
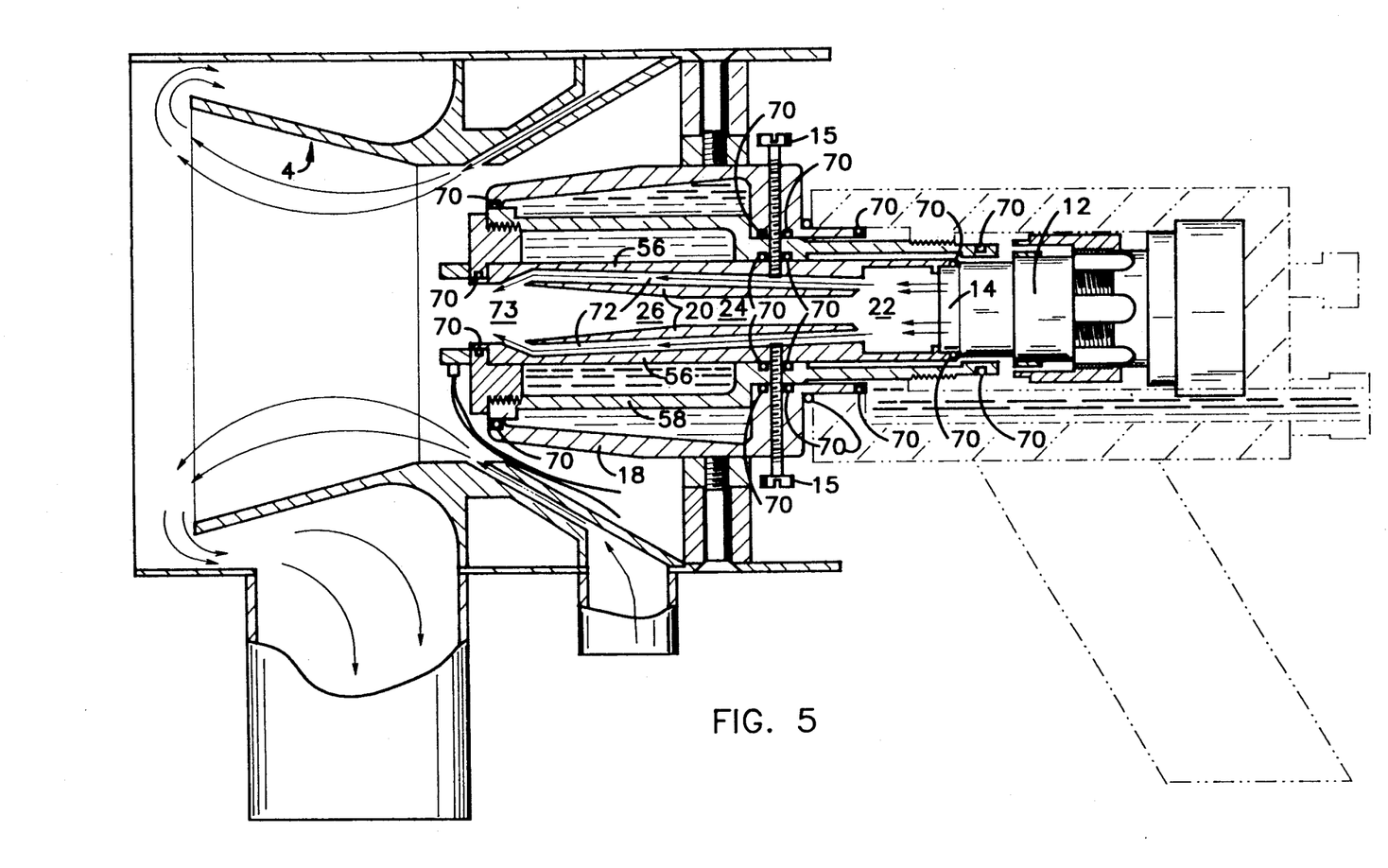
FIG. 5 is a longitudinal sectional view of the present invention taken along line 5—5 of FIG. 2a, showing the nozzle assembly having a plurality of coolant passages therein surrounding a barrel having a plurality of auxiliary jet preheating gas conduits therein spaced apart from one another and extending from the combustion chamber frontward longitudinally along each side of the barrel between the cooling conduits and the barrel bore, and having adjustment means extending radially through the nozzle into the preheating gas conduits.
Figure 6:
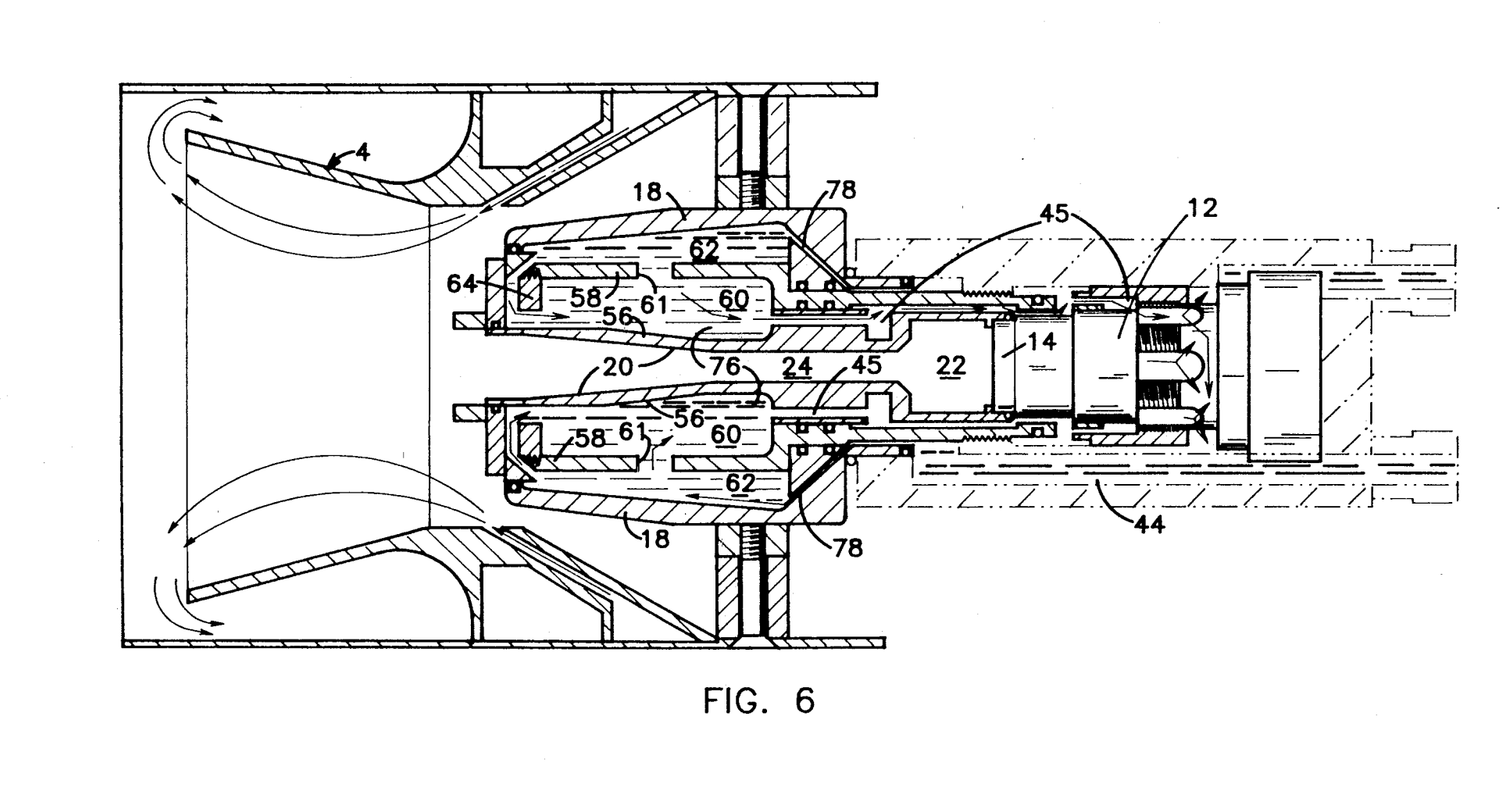
FIG. 6 is a longitudinal sectional view of the present invention taken along the horizontal axis, shown as line 6—6 in FIG. 2a, showing the coaxial shroud surrounding the venturi manifold, a nozzle assembly having a plurality of coolant passages therein surrounding the barrel and combustion chamber thereof, extending through and around the gas flame generator to the coolant connections shown in phantom lines.

FIGS. 4–6 show the generally cylindrical nozzle assembly 16 in detail including a fluid-cooled barrel 20 removably attached to an adaptor plate 14 and is in fluid communication with the HVOF flame generator 12 through which the HVOF gas stream passes upon exiting the HVOF flame generator 12. As shown in the preferred embodiment, the barrel 20 of the nozzle 16 is formed from a solid block of material having good heat transfer properties such as copper. However, it is contemplated that almost any metal and/or heat conducting material may be used for forming the barrel block having powder feed, coolant, and gas cavities formed therein. A plurality of feed substrate conduits, coolant channels, and HVOF gas conduits are formed within the barrel 20. The elongated liquid-cooled barrel 20 is defined by a rearward, generally cylindrically shaped combustion chamber 22, an elongated central bore 24, and an elongated frustoconical shaped front end bore 26 which increases in diameter, tapering outwardly along the longitudinal axis to form a cylindrical outlet opening 29.

A coaxial cylindrical intermediate jacket housing member 58 includes an expanded front portion 51 spaced apart from and coaxially surrounding the barrel portion 20 within the nozzle 16 having internal threads on the interior front surface thereof, a reduced diameter rear portion 53 extending rearward from the nozzle 16 surrounding the combustion chamber 22 of the barrel 20, the adapter plate 14, and a portion of the flame generator 12 in sealed engagement, and a medial step transition portion 55 connecting the expanded front portion 51 with the reduced diameter rear portion 53. The outer exterior wall surface of the barrel 20 within the nozzle 16 forms an interior reservoir wall 56 which is contiguous with and sealably engagement with the medial step transition portion 55 of the coaxial cylindrical intermediate jacket housing member 58.

As shown in FIG. 4, the front end portion of the nozzle assembly 16 includes a cylindrical cap member 64 and a cylindrical main body portion having a flat end plate 66 attached thereto. The end plate 66 is formed having a greater diameter than the main body thereby forming a peripherical lip extending therearound. The main body portion includes a centrally located orifice therethrough, and external threads extending around the outer surface. The end cap 64 is threadably and sealably engaged with the front end portion 51 of the intermediate jacket housing member 58 and contiguous with and sealably engaged with the front end of the barrel 20 and a portion of the barrel forming the interior reservoir wall 56. The cavity formed thereinbetween extending from the end cap 64 to the medial transition step 55 defines a first interior coaxial coolant reservoir 60 to transfer heat from and cool the barrel 20, and provide a means for controlling the preheat temperature of the powder feed within the barrel 20.

Moreover, the nozzle assembly 16 further includes a substantially cylindrical shaped outer jacket housing 18 surrounding the coaxial cylindrical intermediate jacket housing member 58. The expanded front end portion 71 of the outer jacket housing 18 has an exterior surface having an enlarged outer diameter which tapers gradually toward the front end and hooks inwardly at approximately a 90 degree angle forming a hooked lip 57 contiguous and sealingly engageable with the front exterior surface of the intermediate jacket housing member 58. The rear portion 59 of the outer jacket housing 18 is of a reduced diameter extending rearwardly over the portion of the intermediate jacket housing 58 covering the central bore 24 of the barrel 20. The rear portion 59 is sealingly engageable with the outer surface of the reduced diameter rear portion 53 of the intermediate jacket member 58. A medial step transition portion 69 of the outer jacket 18 extends inwardly normal to the longitudinal axis defining an end wall which overlaps the medial step transition portion 55 of the intermediate jacket 58 connecting the expanded front end portion 71 with the reduced diameter rear portion 59. The cavity formed between the expanded front end portion of the outer jacket housing 18 and the exterior surface of the expanded front end portion 51 of the intermediate jacket member 58, extends rearwardly to the medial step portion of the outer exterior coaxial coolant conduit 62 thereinbetween to act as a heat exchanger between the first interior coaxial coolant reservoir 62 and the cool forced air circulating around the nozzle assembly. The second cylindrical member forming the outer jacket housing 18 forms a compression fit with the interior reservoir wall 56, wherein the outer jacket housing 18 is held in the coaxial relationship by engagement of the spray gun body housing 68 shown in phantom lines.

A plurality of O-rings 70, as shown in FIG. 5, provides seals between the cap 66, barrel 20, interior reservoir wall 56, outer jacket member 18, and the adapter plate 14. The rear portion of the nozzle 16 assembly is mounted to the HVOF flame generator 12 by an adaptor plate 14 which permits the exchange of coolant between the generator 12 and the nozzle 16. An ignition plug 25 projects outward from the plate 66 and below the flow of the HVOF gas at the front end of the nozzle 16 to ignite the combustible gases; however, it is contemplated that the gun 1 could incorporate different types of ignition means internally or externally to ignite the HVOF gas. As viewed from the front, the HVOF spray gun includes a shroud 2, vacuum recovery chamber 49, venturi manifold 4, baffle 40, nozzle 16, nozzle end cap 64, and vacuum connection 5 as shown in FIG. 2a).

A novel means for the introduction of a thermoplastic coating substrate into the spray gun 1 and a novel means to preheat the thermoplastic coating substrate to a preselected temperature prior to introduction of the substrate into the HVOF stream at a point downstream of the barrel outlet opening 29 are best shown in FIGS. 4-6. The orientation of the sectional views for FIGS. 4-6 are shown as taken along the longitudinal axis of the HVOF thermal spray gun 1, wherein FIG. 4 is normal to the horizontal plane, FIG. 5 is offset approximately 30 degrees from the horizontal plane, and FIG. 6 is offset approximately 90 degrees from the horizontal plane.

As shown in FIG. 4, a pair of plastic substrate introduction feed tube connection conduits 13 are mounted behind the shroud 2, spaced apart from one another, and positioned generally opposite one another. The feed tube conduits 13 extend radially inward through the coaxial cylindrical outer jacket housing 18 of the nozzle 16 into the barrel 20. The feed tube connection conduits 13 enter through the rearward portion of the barrel 20 at approximately a 90 degree angle and extend frontward along the longitudinal axis of the barrel 20 forming a pair of powder feed preheating conduits 31 within the barrel block positioned axially between the central bore 24 and the interior reservoir wall 56 forming the exterior surface of the barrel 20 forming a preheating zone for the powder feed substrate. The powder feed preheating conduits 31 extend axially along each side of the barrel 20 so that the plastic powder feed substrate travels through the barrel 20 in two separate generally parallel conduits 31 spaced apart from one another formed within the barrel 20 to provide optimal heat transfer between the cooling passages and the HVOF gas plume. The feed powder polymer substrate, usually in powdered form, is injected into the main HVOF gas stream downstream near the front end of the barrel 20 at intersection point 73 and forced through outlets into the main gas plume of the elongated conical bore portion 26 at a selected angle of from about 5 to about 35 degrees. The angle of intersection of the feed conduits 31 and the conical bore 26 of the barrel 20 is dependent upon the length of the barrel, the substrate selected, substrate feed rate, and the temperature required for preheating and application of a particular thermoplastic polymer substrate.

In reference to FIG. 5, the nozzle assembly 16 includes a plurality of coolant passages therein surrounding the barrel 20 which has a plurality of auxiliary jet preheating gas conduits 72 therein spaced apart from one another and extending from the combustion chamber 22 frontward longitudinally along each side of the barrel 20 between the first interior coaxial coolant reservoir 60 and the barrel bore 24. Auxiliary jet preheating gas adjustment means 15 extend radially through the nozzle into the preheating gas conduits 72.

A plurality of auxiliary jet thermoplastic powder preheating gas conduits 72 are formed within the barrel block between the interior reservoir wall 56 and the central bore 24 extending from the conical shaped front end portion 26 of the barrel 20 rearward to the combustion chamber 22. As shown best in FIG. 7, the preheating gas conducts 72 are positioned in pairs spaced apart from one another on opposite sides of the barrel 20 and extend axially along the longitudinal axis generally parallel to the central bore 24. Although the preferred embodiment utilizes two pairs of preheating gas conduits it is contemplated that at least one preheating gas conduit positioned properly adjacent to each feed conduit would provide an operable unit. In the preferred embodiment, one of the auxiliary jet preheating conduits 72 is axially disposed on each side of each of the powder feed preheating conduits 31 for conveyance and heat transfer of the gases produced in combustion chamber 22 to preheat the powder as it travels through the barrel 20. The combustion gases flow through the preheating conduits 72 forming hot plumes which are injected into the main HVOC gas stream flowing through the central bore of the barrel 20 downstream near the front end of the barrel 20. The preheating gas conduits 72 open into the main gas plume stream flowing through the central bore 24 of the barrel 20 at approximately the same point as the powder feed conduits 31 at intersection point 73. Injection of the hot combustion gas plumes from preheating conduits 72 into the main HVOC gas plume along the central axis near the elongated conical shaped front end portion 26 of the barrel 20, forms a ring of flame injectors to assure efficient heating and melting of the thermoplastic feed substrate and good acceleration of the particles into a tight, uniform spray pattern. The angle of intersection of the feed conduits 31 with the central bore of the barrel 20 along intersection point 73 is about 5 to 35 degrees depending upon the length of the barrel, the substrate selected, the substrate feed rate, and the residence time needed for preheating a particular substrate.

Figure 7:
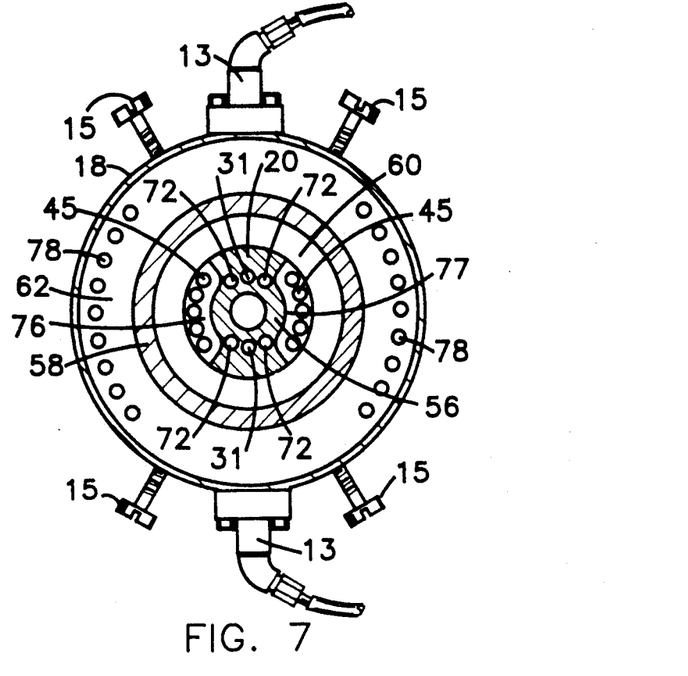
FIG. 7 is an enlarged, elevated front end sectional view along line 7—7 of FIG. 3, showing the nozzle having a plurality of coolant feed conduits extending into a coolant circulation reservoir surrounding a barrel having a plurality of coolant passages therein spaced apart and adjacent to one another separated by two pairs of spaced apart auxiliary jet preheating gas conduits contiguous therewith, and a pair of polymer feed conduits spaced apart from one another and between said axially jet preheating gas conduits.

The auxiliary jet preheating gas adjustment means 15 comprise a first and second pair of adjustable preheater valve screws 15, one for each preheating conduit 72, extend from the base of the shroud 2 outside of the nozzle 16, radially through the nozzle 16 into the barrel 20 at an angle generally normal to the longitudinal axis of the spray gun 10. The adjusting valves 15 extend into the auxiliary jet preheating gas conduits 72 to restrict and control the flow rate of the combustion gases in the preheating gas conduits 72 to preheat the thermoplastic particles to the desired temperature for the proper preplasticization before injection of the plastic particles into the main HVOF stream.

As best shown in FIGS. 6 and 7, a liquid coolant, such as water, is circulated through the nozzle assembly 16, wherein nozzle assembly 16 is provided with a plurality of external coolant supply conduits surrounding the barrel 20 and combustion chamber 22 thereof, wherein some of the coolant passages extend through and around the gas flame generator 12 to the coolant connections located in the end of the thermal spray gun body 3 to control the temperature of the components in contact with the HVOF gas, the temperature of the thermoplastic feed substrate, and the external temperature of the thermal spray gun 1 which comes into contact with the user.

As shown in FIG. 6, coolant enters the gun body 3 through coolant feed nozzle 21 flowing forward through exterior coolant supply channels 44, around the HVOF flame generator 12 and around the combustion chamber 22 portion of the barrel 20 into the nozzle 16 through a plurality of coolant reservoir feed conduits 78 extending axially outward at an angle through the rear wall of the nozzle 16 in a radial pattern. The coolant flows through coolant reservoir feed conduits 78 and around the coaxial cylindrical intermediate jacket housing member 58 surrounding the barrel 20, filling and circulating through the large capacity liquid coolant jacket forming the second exterior coolant conduit reservoir 62 which extends the length of the nozzle 16. The coolant circulates around and through reservoir 62 within the nozzle 16 to be further cooled by the forced air around the venturi manifold 4. The nozzle 16 is thus cooled both by the circulation of liquid coolant within, as well as the flow of cooling air or gas over exterior surface of the nozzle 16. As the coolant circulates through reservoir 62, it spills through an opening 61 formed in the interior reservoir wall 56 into the large capacity liquid coolant jacket forming the first interior coaxial coolant reservoir 60 which surrounds the barrel 20 containing the central bore 24 and conical front end portion 26 to transfer heat from and cool the barrel 20.

As shown in the cross-sectional view of FIG. 7, the portion of the barrel 20 forming the interior reservoir wall 56 is sinusoidal shaped forming an axial bulge 77 which extends inwardly toward the central bore 24. Moreover, the interior reservoir wall 56 of the barrel 20 as shown in FIGS. 4 and 5 is recessed as shown in FIG. 6 forming a pair of inner reservoir channels 76 extending inwardly toward the central bore 24 of the barrel 20 to increase the area of the first interior coaxial coolant reservoir 60. The inner reservoir channels 76 are spaced apart and extend axially along the barrel 20 opposite one another between the first and second pairs of auxiliary gas preheating conduits 72 to provide additional heat transfer surface in close proximity to the preheating conduits 72. The coolant circulates around the preheating conduits 72 and provides an additional means for controlling the preheat temperature of the auxiliary jet preheating gas and plastic powder feed substrate within the barrel 20 flowing through feed conduits 31 between the preheating conduits 72.

Figure 8:
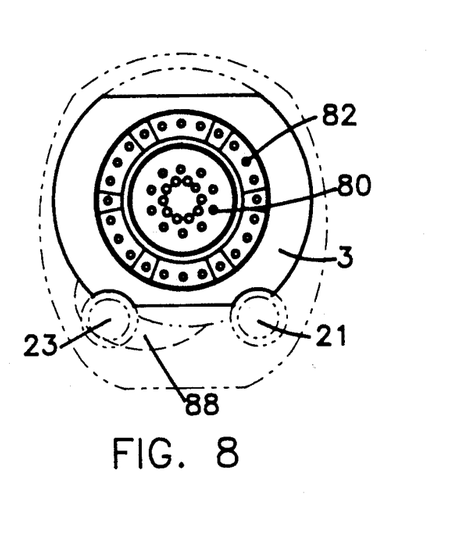
FIG. 8 is an elevated front end sectional view along line 8—8 of FIG. 3, showing the adapter plate mounted at the rear of the nozzle and the coolant connections shown in phantom lines; and, FIG. 9 is an end view of the gun body and coolant connections shown in phantom lines.
Figure 9:
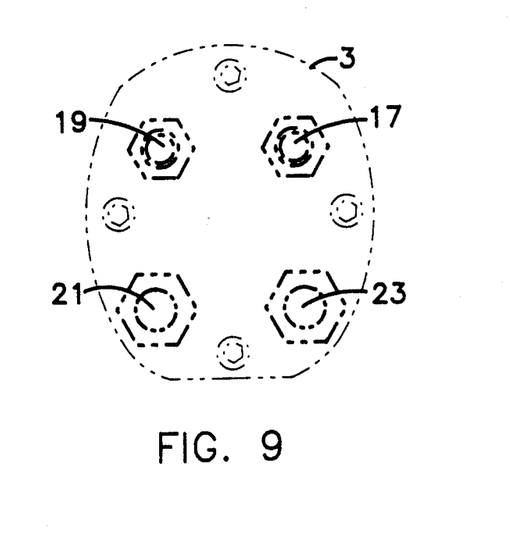

The coolant flows through the first interior coaxial coolant reservoir 60 extending through the nozzle 16 axially from the front of the barrel rearward. The coolant reservoir 60 narrows along the elongated central bore 24 portion of the barrel 20 forming a plurality of interior coolant return channels 45 which extend adjacent the portion of the barrel 20 containing the central bore 24 and expansion chamber 22. The coolant flows inwardly from the second exterior coolant reservoir 62 through interior reservoir 60 and rearward through interior coolant return channels 45. The interior coolant return channels are in fluid communication with a plurality of fluid coolant supply conduits 82 coaxially surrounding the HVOF gas generator conduits 80 to cool the gun body 3 as shown in the cross-sectional view of FIG. 8. FIG. 8 also shows the coolant feed connection 21 which transports coolant to the gun body 3 and the return conduit 23 which is connected with a grooved cavity 88 formed in the gun body 3 to collect the hot coolant pumped through the HVOF gun 1. The hot coolant may be removed and cooled by a heat exchanger for reuse.

The HVOF flameless thermoplastic spray gun of the present invention can be used to apply a variety of coating substrates. For instance, a polyamide, such as Nylon 11, having a particle size of approximately 75 microns provides a decorative-high slip exterior-durable coating, resistant to chipping, solvents, stains, and detergents. Polyamides are used primarily for industrial piping, food processing, and marine application. Deposition rates of up to 30 pounds of lightweight Nylon 11 thermoplastic per hour are obtainable with the HVOF thermal spray gun of the preferred embodiment.

Polyester powders in the same micron range are used to provide durable, attractive coatings for products that are subject to exposure including patio furniture, heavy equipment, automotive, and marine finishes.

Epoxy coatings for concrete reinforcing cable having a particle size of about 75 to about 225 microns which are designed for use on steel cable requiring super corrosion resistance and high flexibility such as prestressed concrete for highway bridge decks and concrete structural membranes exposed to marine and salt environments.

Polyphenylene sulfide, ("PPS"), having a particle size of approximately 75 microns, has high heat stability to 480° F. and excellent chemical resistance with no known solvents under 400° F. and no coating thickness limitation. PPS is successfully used in high temperature and corrosive industrial applications such as for pipes, pumps, valves, tanks, and reactors.

Polypropylene ("PP") having a particle size of approximately 75 microns, is a stereo-specific thermoplastic polymer of propylene which is especially chemical resistant to hydrocarbons, alcohols, nonoxidizing agents, stress cracking, abrasion, and is impermeable to water vapor. PP is especially useful for battery case liners, medical, and food processing.

A polyvinyldifloride, ("PVDF") thermoplastic ceramic composite formulation in the 75 micron particle range is especially formulated for coating materials which must be resistant to chlorine, chlorine dioxide, and other bleaching chemicals.

Combinations of polymers such as polyethylene block amide ("PEBAX"), a new thermoplastic elastomer, combine the properties of nylon and rubber to provide excellent impact resistance, a low coefficient of friction, and flexibility at low temperatures, and is used in automotive bumpers and the aerospace industry.

Ultra high molecular weight polyethylene ("UHMWPE") is a linear, low-pressure, polyethylene resin having a molecular weight of about $(4 \times 10^6)$ which is about ten times the molecular weight of high density polyethylene ("HDPE"). UHMWPE has a particle size of approximately 75 microns and is used in applications requiring a coating which withstands high abrasion and is resistant to corrosive chemical attacks.

The extremely high processing viscosities associated with the high molecular weight resins require special processing procedures for application because the resin does not exhibit a measurable flow index and is more like an amorphous solid. The most common methods for fabrication of UHMWPE are ram extrusion and compression molding. However, the HVOF thermal spray gun of the present invention provides a means for spraying a UHMWPE coating on a substrate and reducing the residence time the polymer is exposed to heat to provide a superior coating as compared to conventional application methods.

For example, the UHMWPE powder resin is fed to the thermal spray gun of the present invention by a carrier gas such as nitrogen. The UHMWPE powder feed flows through the feed substrate tubes 13 axially through the nozzle 16. The powder feed is carried into the preheater zone within the barrel 20 where it is preheated in the feed substrate conduits 31 by heat conducted through the barrel 20 from the auxiliary jet preheating conduits 72 extending axially therealong. The UHMWPE powder feed is heated to about 240° F., which is about 50° F. below the crystalline melting temperature of the UHMWPE polymer; however, the UHMWPE does not melt or liquify within the powder feed conduits 31. As the UHMWPE powder is injected into the HVOF main gas plume flowing through the melting zone in the center of the barrel 20, the temperature of the preheated UHMWPE feed powder is increased from about 240° F. to about 270° F. to 300° F., the melt temperature of the polymer, while traveling at a high velocity of about 1,200 feet per second. As the UHMWPE particle melt exits the barrel 20 through the nozzle 16, the temperature of the melt particles are reduced by about 10° F. to 30° F. in flight by the induced nitrogen shielding gas flowing around the nozzle 16, and entrained between the venturi manifold 4, and shroud 2. Although air could be used as the shielding gas, an inert gas such as nitrogen reduces oxidation leading to degradation of the crosslinked polymer melt particles to provide an improved coating. The individual UHMWPE particles are further compressed and fused together in flight removing entrained gas particles from the particle melt mix to provide a homogenous melt exiting the shroud 2 of the HVOF thermal spray gun shroud 2.

Typical spray rates for the thermal thermoplastic spray gun of the present invention are typically about 22 to 44 pounds per hour for a substrate such as the UHMWPE. Production rates are dependent upon the powder feed volume, bulk density of the powder resin, carrier gas speed, preheating capacity, and the velocity of the particle melt. The melt temperature of the UHMWPE is maintained at as low a temperature as possible to provide a good melt and shorten the residence time for providing sufficient cooling to the particle melt before contact with the object being coated.

The foregoing detailed description is given primarily for clearness of understanding and no unnecessary limitations are to be understood therefrom, for modification will become obvious to those skilled in the art based upon more recent disclosures and may be made without departing from the spirit of the invention and scope of the appended claims

I claim:

1. A thermal spray apparatus for spraying molten substrate coatings, comprising:
   high velocity oxygen fuel ("HVOF") generating means;
   an elongated nozzle downstream from and in flow communication with said HVOF generating means for receiving an HVOF stream therefrom, said elongated nozzle including a fluid cooled barrel therein, said barrel having a central bore therethrough with an inlet opening and an outlet opening;
   means for the introduction of a feed substrate into said HVOF stream at a point within said nozzle downstream from said inlet opening;
   means for circulating cooling gas exteriorly of and around said nozzle; and,
   means for preheating said feed substrate to a preselected temperature prior to introduction into said HVOF stream.

2. The apparatus of claim 1, wherein said means for ciculating cooling gas includes a shroud circumscribing said nozzle and extending downstream therefrom, said shroud having a forced cooling gas connection and a vacuum connection for permitting cooling gas to flow around said nozzle and substantially coaxial with the flow of the HVOF gas stream.

3. The apparatus of claim 2, wherein said means for circulating cooling gas exteriorly of and around said nozzle includes a vacuum means in fluid communication with said vacuum connection of said shroud for removing hot gases and entrained feed substrate particles away from the main HVOF stream exiting said nozzle.

4. The apparatus of claim 2, wherein said means for circulating cooling gas exteriorly of and around said nozzle includes a forced gas means in fluid communication with said forced gas connection of said shroud for circulating cooling gases around said nozzle and substantially coaxial with the flow of the HVOF gas stream.

5. The apparatus of claim 2, further including a generally hourglass shaped coaxial venturi manifold attached to and supported within said shroud defining a vacuum chamber thereinbetween in fluid communication with said vacuum connection.

6. The apparatus of claim 5, wherein said shroud includes a circumferential baffle attached to the interior surface thereof, said baffle extending forward in an inwardly direction, said baffle being spaced apart from and parallel to the rear portion of said venturi manifold forming an annular forced cooling gas circulation passage around said nozzle.

7. The apparatus of claim 1, including an adapter plate connecting said barrel with and disposed between said HVOF generating means and said nozzle, said adapter plate having at least one HVOF gas conduit extending therethrough in fluid communication with said HVOF generating means and said barrel.

8. The apparatus of claim 1, wherein said fluid cooled barrel includes a combustion expansion chamber in fluid communication with said HVOF generating means and an elongated central bore.

9. The apparatus of claim 8, wherein said elongated central bore, extending outwardly from said elongated central bore, includes an elongated frustoconical shaped front end and a generally cylindrical outlet opening.

10. The apparatus of claim 1, further including a coolant circulation means in fluid communication with said nozzle and said HVOF generating means.

11. The apparatus of claim 1, wherein said means for the introduction of said feed substrate into said HVOF stream comprises at least one substrate feed tube extending through said nozzle to said barrel including at least one feed substrate conduit spaced apart from said central bore and extending generally axially and parallel to said central bore in flow communication with said means for the introduction of said feed substrate into said HVOF stream.

12. The apparatus of claim 11, wherein each said feed substrate conduit intersects said central bore near the outlet opening of said central barrel.

13. The apparatus of claim 11, wherein each said feed substrate conduit intersects said central bore of said barrel at an angle of from about 5 degrees to about 35 degrees.

14. The apparatus of claim 1, wherein said means for preheating said feed substrate to a preselected temperature prior to introduction into said HVOF stream comprises at least one auxiliary HVOF gas preheating conduit within said barrel spaced apart from said central bore, said auxiliary HVOF gas preheating conduit extending generally axially and parallel to said central bore in fluid communication with said HVOF generating means.

15. The apparatus of claim 14, further including adjustable HVOF auxiliary preheater valve adjustment means extending through said nozzle into each said HVOF auxiliary gas preheating conduit within said barrel for intersecting and restricting the flow of the HVOF gas and controlling the temperature of the feed substrate.

16. The apparatus of claim 14, wherein each said HVOF auxiliary preheating gas conduit intersects said central bore near the outlet opening of said central barrel.

17. The apparatus of claim 14, wherein each said auxiliary HVOF gas preheating conduit intersects said central bore of said barrel at an angle of from about 5 degrees to about 35 degrees.

18. The apparatus of claim 1, including a first coaxial coolant reservoir formed around the central barrel within said nozzle.

19. The apparatus of claim 18, including at least one coolant passage within said nozzle, each said coolant passage being recessed within the exterior surface of said barrel, extending generally axially and parallel to said central barrel, and in fluid communication with a first coaxial coolant reservoir formed around the central barrel within said nozzle.

20. The apparatus of claim 18, including a plurality of interior coolant return channels in fluid communication with said first coaxial reservoir, said interior coolant return channels extending along said central barrel and through a plurality of conduits arranged coaxially around at least one central HVOF passage within said HVOF generating means.

21. The apparatus of claim 18, including a second coaxial reservoir formed around said first coaxial coolant reservoir and in fluid communication with said first coaxial coolant reservoir.

22. The apparatus of claim 21, including a plurality of coolant reservoir feed conduits extending outward and angled radially from said second coaxial coolant reservoir in fluid communication with at least one exterior coolant supply channel spaced apart externally from a plurality of interior coolant return channels, said exterior coolant supply channels extending around said HVOF flame generator.

23. The apparatus of claim 1, wherein said fluid cooled barrel includes a first feed substrate conduit and a second feed substrate conduit extending axially adjacent to said central bore of said barrel in spaced apart relationship thereto, a first pair of HVOF auxiliary gas preheating conduits extending axially parallel and adjacent to and on each side of said first feed substrate conduit and a second pair of HVOF auxiliary gas preheating conduits extending axially parallel and adjacent to and on each side of said second feed substrate conduit, said first and second pairs of HVOF auxiliary gas preheating conduits being in fluid communication with said HVOF generating means.

24. The apparatus of claim 23, wherein said feed substrate conduits intersect said central bore of said barrel at an angle of from about 5 degrees to about 35 degrees.

25. The apparatus of claim 23, wherein said HVOF auxiliary gas preheating conduits intersect said central bore of said barrel at an angle of from about 5 degrees to about 35 degrees.

26. The apparatus of claim 23, further including adjustable HVOF auxiliary preheater valve adjustment means extending through said nozzle into said HVOF auxiliary gas preheating conduits within said barrel for intersecting and restricting the flow of the HVOF gas and controlling the temperature of the feed substrate.

27. The apparatus of claim 23, wherein said HVOF auxiliary preheating gas conduits intersect said central bore near the outlet opening of said central barrel.

28. The apparatus of claim 1, wherein said feed substrate is a polymer.

29. The apparatus of claim 1, wherein said feed substrate is a thermoplastic.

30. The apparatus of claim 1, wherein said feed substrate is selected from the group consisting of phenolformaldehyde, polytetrafluoroethylene, polyphenylene sulfide, polypropylene, polyvinyldifloride, polyethylene block amide, ultra high molecular weight polyethylene, high density polyethylene, polyethylene, polyamide, and polyvinylchloride.

31. The apparatus of claim 1, wherein said feed substrate is a metal.

32. The apparatus of claim 1, wherein said feed substrate is ceramic.

33. The apparatus of claim 1, wherein said feed substate is graphite.

34. The apparatus of claim 1, wherein said feed substrate is a mixture of metal/plastic, metal/ceramic, or plastic/ceramic.

35. The apparatus of claim 1, wherein said feed substrate is a powder.

* * * * *